United States Patent
DeCristofaro et al.

(10) Patent No.: US 8,954,737 B2
(45) Date of Patent: Feb. 10, 2015

(54) METHOD AND APPARATUS FOR PERFORMING DISTRIBUTED PRIVACY-PRESERVING COMPUTATIONS ON USER LOCATIONS

(71) Applicant: Palo Alto Research Center Incorporated, Palo Alto, CA (US)

(72) Inventors: Emiliano DeCristofaro, Mountain View, CA (US); Joan Melia-Segui, Palo Alto, CA (US); Rui Zhang, San Francisco, CA (US); Oliver Brdiczka, Mountain View, CA (US); Ersin Uzun, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 30 days.

(21) Appl. No.: 13/921,023

(22) Filed: Jun. 18, 2013

(65) Prior Publication Data
US 2014/0372753 A1 Dec. 18, 2014

(51) Int. Cl.
*H04L 29/06* (2006.01)
*G06F 21/62* (2013.01)

(52) U.S. Cl.
CPC ................................ *G06F 21/6218* (2013.01)
USPC .............. 713/167; 380/44; 455/411; 709/224

(58) Field of Classification Search
None
See application file for complete search history.

(56) References Cited

U.S. PATENT DOCUMENTS

| | | | | |
|---|---|---|---|---|
| 7,434,048 | B1 * | 10/2008 | Shapiro et al. | 713/165 |
| 7,920,073 | B2 * | 4/2011 | Woo et al. | 340/995.17 |
| 8,625,799 | B2 * | 1/2014 | McCarthy et al. | 380/277 |
| 8,630,620 | B2 * | 1/2014 | Cha et al. | 455/411 |
| 2008/0074290 | A1 * | 3/2008 | Woo et al. | 340/934 |
| 2010/0151882 | A1 * | 6/2010 | Gillies et al. | 455/456.1 |
| 2012/0106738 | A1 * | 5/2012 | Belenkiy et al. | 380/270 |
| 2012/0284511 | A1 * | 11/2012 | Paddon et al. | 713/168 |
| 2013/0117155 | A1 * | 5/2013 | Glasgo | 705/26.35 |
| 2014/0040463 | A1 * | 2/2014 | Skvortsov et al. | 709/224 |
| 2014/0187266 | A1 * | 7/2014 | Nawaz et al. | 455/456.3 |
| 2014/0205097 | A1 * | 7/2014 | Belenkiy et al. | 380/270 |

* cited by examiner

*Primary Examiner* — Fikremariam A Yalew
(74) *Attorney, Agent, or Firm* — Shun Yao; Park, Vaughan, Fleming & Dowler LLP

(57) ABSTRACT

A location-trace comparison system can perform privacy-preserving computations on locations traces for two or more users, for example, to determine a location-visit overlap for these users. During operation, the system obtains location-event descriptions for locations that a local user has visited and/or is likely to visit, such that a respective location-event description indicates a location identifier and a time-interval identifier. The system encrypts the location-event descriptions to generate a corresponding set of encrypted local-user events, and receives encrypted remote-user events from a remote device, for at least one remote user. The system compares the encrypted location events to determine an overlap between the set of encrypted local-user events and the set of encrypted remote-user events. The system then determines, from the encrypted-event overlap, location-event descriptions for locations that the local and remote users have both visited and/or are both likely to visit during the same time interval.

24 Claims, 8 Drawing Sheets

METHOD AND APPARATUS FOR PERFORMING DISTRIBUTED PRIVACY-PRESERVING COMPUTATIONS ON USER LOCATIONS

BACKGROUND

1. Field

This disclosure is generally related to recommender systems. More specifically, this disclosure is related to performing computations on user locations while preserving a user's privacy.

2. Related Art

Advances in portable Internet-enabled computing technologies have made it easier for people to share and receive content while on the go. To take advantage of these portable computing capabilities and people's desire to share information, many entrepreneurs have produced online social-media services that allow people to share their social experiences with the general public in the form of micro-blogs or user-generated reviews. These social-media services also allow people to use their portable devices to search for recommendations for new places to visit or new activities to explore, and to share locations they've visited with others.

However, aside from all the benefits that these services provide to their members, these social-media services are finding it difficult to monetize on their large user base. One common revenue source is to provide paid advertisements or recommendations to users based on the activities they are performing, oftentimes by recommending activities or venues that are close to a person's current location. If the user desires to view recommendations for a location to which the user plans to visit in the near future, the user has to manually fine-tune the search parameters to specify a desired geographic region.

Some recommender systems attempt to model a user's behavior to provide recommendations for activities the user may be interested in performing in the near future. Oftentimes, these recommender systems generate behavior models by analyzing explicit location information for a plurality of users. Unfortunately, this explicit location information can reveal sensitive information pertaining to these users, such as venues that these users have visited and activities these users have performed.

SUMMARY

One embodiment provides a location-trace comparison system that performs privacy-preserving computations on location traces for two or more users, for example, to determine a location-visit overlap for these users. During operation, the system obtains location-event descriptions for locations that a local user has visited and/or is likely to visit, such that a respective location-event description indicates a location identifier and a time-interval identifier. The system encrypts the location-event descriptions to generate a corresponding set of encrypted local-user events, and receives encrypted remote-user events from a remote device, for at least one remote user. The system compares the encrypted location events to determine an overlap between the set of encrypted local-user events and the set of encrypted remote-user events. The system then determines, from the encrypted-event overlap, one or more location-event descriptions for locations that the local and remote users have both visited and/or are both likely to visit during the same time interval.

In some embodiments, while encrypting a respective location-event description, $A_i$, the system computes:

$$\alpha_i = (H(A_i) * R_1^e) \bmod N.$$

The tuple (N,e) corresponds to a public key published by the remote device, and $R_1$ corresponds to a random number $R_1 \in Z_N$ generated by the local device. Also, $H(A_i)$ corresponds to a hash value for event description $A_i$.

In some embodiments, while determining the encrypted-event overlap, the system sends the encrypted local-user events to the remote device, and receives a set of remote-encrypted local-user events. The system then compares the remote-encrypted local-user events to the encrypted remote-user events, and determines one or more remote-encrypted local-user events that have a matching encrypted remote-user event.

In some embodiments, the remote-encrypted local-user event, $\gamma_i$, has the form:

$$\gamma_i = \alpha_i^d \bmod N = H(A_i)^d R_1 \bmod N.$$

The variable $\alpha_i$ corresponds to an encrypted local-user event for an event description $A_i$, and the tuple (N,d) corresponds to a private key generated by the remote device. Further, the variable $R_1$ corresponds to a random number generated by the local device, and $H(A_i)$ corresponds to a hash value for the event description $A_i$.

In some embodiments, while comparing the remote-encrypted local-user events to the encrypted remote-user events, the system adjusts the remote-encrypted local-user event for a comparison operation, for example, by computing an adjusted value $H(\gamma_i/R_1)$. The system then performs a bitwise comparison between the adjusted values to the set of encrypted remote-user events to find a matching encrypted remote-user event.

In some embodiments, the encrypted remote-user event has the form:

$$\beta_i = H(H(B_i)^d \bmod N).$$

wherein (N,d) corresponds to a private key generated by the remote device, and wherein $H(B_i)$ corresponds to a hash value for event description $B_i$.

In some embodiments, the system can modify the set of encrypted local-user events to further preserve the local user's privacy, and sends the modified set of encrypted local-user events to the remote device.

In some variations, while modifying the set of encrypted local-user events, the system can remove entries associated with a restricted location identifier, remove entries associated with a restricted time interval, remove entries for location events the local user, and/or pad the set of encrypted local-user events to include a set of random-value entries.

In some embodiments, the system computes aggregate statistics between the local user and the at least one remote user based on the encrypted-event overlap. The aggregate statistics can include: a sum of location events in common between the local user and the at least one remote user; an average number of location events in common between the local user and the at least one remote user; and/or a variance for a number of location events in common between the local user and the at least one remote user.

In some embodiments, the system generates a recommendation for the local user, based on location events associated with the encrypted-event overlap.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a location-event comparison system that solves the problem of computing statistical information on location traces in common between multiple users, without revealing sensitive information pertaining to these users. Specifically, the system can share a local user's location events with other devices, in an encrypted form that still allows the other devices to compare the local user's location events with that of another user.

The system can also implement a distributed framework for performing computations on multiple location traces. The system can receive encrypted location events for other users, and can compare the other users' encrypted location events to the local user's encrypted location events, to determine which location events are common to the local user and one or more other users. Neither the local device nor the remote devices try to decrypt the encrypted location events to determine the overlapping events, which preserves the privacy for all users involved. The actual location events are not revealed until a match is made. To reveal another user's location event, the system needs to match an existing location event for the local user to the remote user's encrypted location event.

In some embodiments, a location event's description indicates a location identifier and a time-interval identifier. The location identifier can indicate a venue (e.g., "Joe's Coffee Shop"), a venue type (e.g., "movie theater"), or for a geographic location (e.g., a city name, or global positioning system (GPS) coordinates). The time-interval identifier can indicate a unique identifier for a given time interval, such as a starting time for a time interval, or a description for a time interval. Also, the time intervals can have a fixed duration (e.g., 5 minutes), and the starting times may be selected from a predetermined time-of-day set (e.g., 12:00 AM, 12:05 AM, etc.). In some embodiments, the format for the time-interval identifier is universal across a plurality of computing devices that exchange encrypted user-location events.

Figure 1:
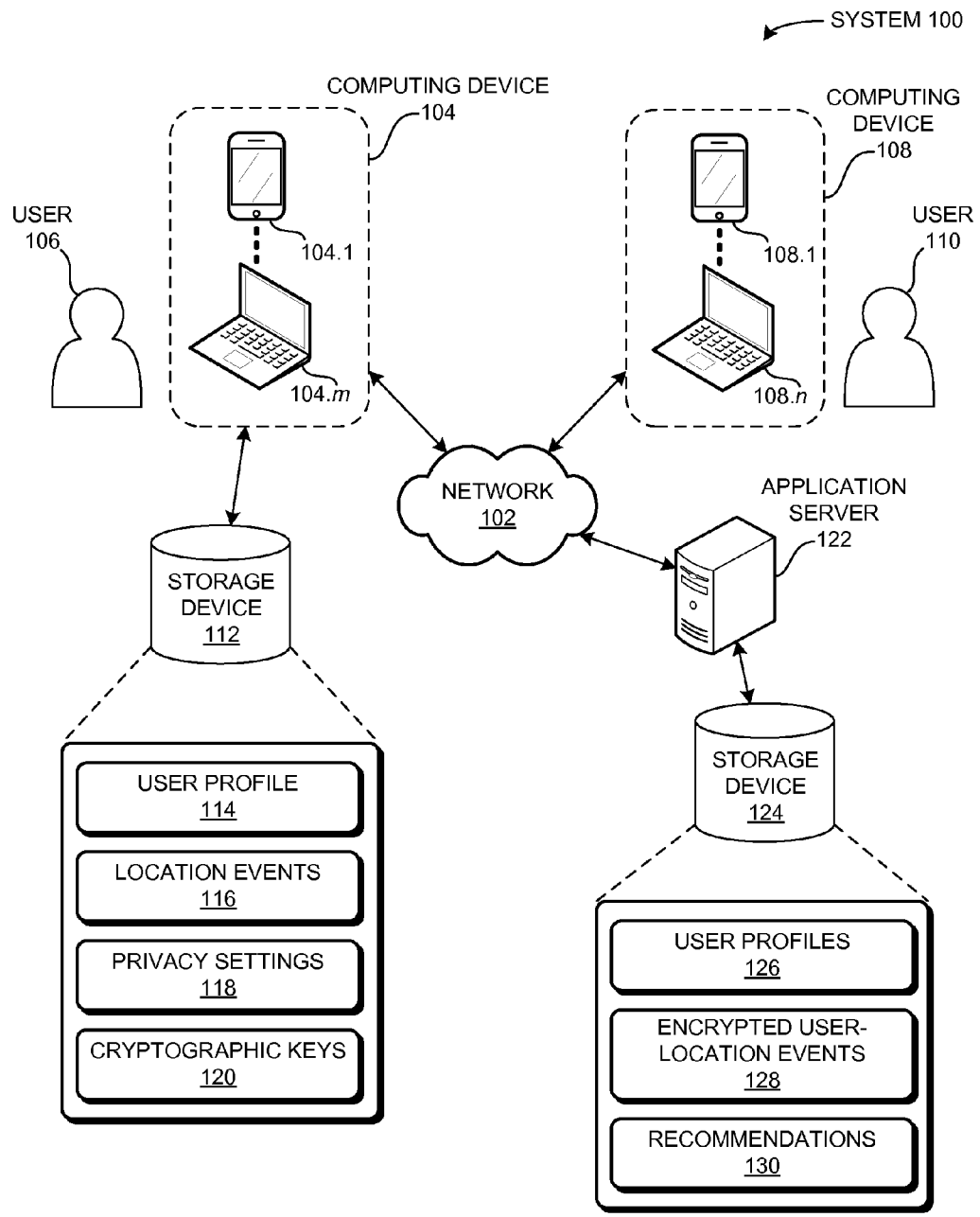
FIG. 1 illustrates an exemplary computer system that facilitates determining location traces that are common for two or more entities in accordance with an embodiment.

FIG. 1 illustrates an exemplary computer system 100 that facilitates determining location traces that are common for two or more entities in accordance with an embodiment. Computer system 100 can include a computer network 102, which can include any wired or wireless network that interfaces various computing devices to each other, such as a computer network implemented via one or more technologies (e.g., Bluetooth, Wi-Fi, cellular, Ethernet, fiber-optic, etc.).

Computer system 100 can also include a computing device 104 coupled to network 102 and operated by a user 106, and a computing device 108 coupled to network 102 and operated by user 106. In some embodiments, computing devices 104 and 108 can include a portable computing device that a user can travel with, use to communicate with others, perform tasks, and manage a personal or shared calendar. For example, computing device 104 can include a smartphone or tablet computer 104.1, or any other personal computing device 104.m such as a laptop computer, a desktop computer, etc.

As user 106 performs activities throughout the day, user 106 can use computing device 104 to share user-behavior events that include location-sensor and/or motion-sensor information related to the activities that user 106 is performing or waiting to perform. For example, user 106 can configure computing device 104 to periodically determine location and/or motion information about user 106 (e.g., using a location sensor embedded within or attached to computing device 104), and to upload this location and motion information to a third-party server (e.g., a location-based social-media service). The location-sensor measurements can include measurements made by a global positioning service (GPS) sensor, or a Wi-Fi or cell-tower triangulation device that can be used to track the user's location as well as a motion and direction over time. Thus, computing device 104 and the third-party server may store a location trace for user 106, which indicates locations that to which user 106 travels as he performs activities throughout his day (e.g., travels to certain locations, meets with others, visits a restaurant or any other type of venue, etc.).

As another example, user 106 can manually interact with an application on computing device 104 (e.g., a Web-based application or a native application executing on computing device 104) to provide a current location and/or behavior information to the third-party server. Thus, user 106 may be selective as to which locations and activities he decides to share with the location check-in service, as he manually shares his location shortly after entering a venue (e.g., after being seated at a restaurant and before looking at the menu), and/or shortly before leaving the venue (e.g., to recommend the venue to friends or write a revue for the general public). Computing device 104 can store these location check-in events to build a historical location trace for the user, and/or to predict future location traces that the user may visit.

In some embodiments, computing device 104 can include or be coupled to a storage device 112, which can store a use profile 114 for user 106, location events 116, privacy settings 118, and cryptographic keys 120 for encrypting location events 116. User profile 114 can include user-account information, address and contact information, user-generated content (e.g., calendar entries, emails, online-chat communications with friends, etc.), as well as demographic information for user 106. Location events 116 can include both historical location events and the future location events. Computing device 104 can determine future location events for user 106, for example, by extrapolating historical location events into the future, and/or based on the content generated by user 106.

Computing device 104 can share location events 116, in encrypted form, to allow other computing devices or an application server 122 to compare location traces for user 106 with other users' location traces to detect a location-event overlap with the other users. This allows computing device 104 or application server 122 to detect a group of users that are likely to visit a certain location at the same time, and to provide user 106 with a recommendation to collaborate with others in the group. For example, computing devices 104 and 108 may exchange encrypted user-location events with each other to search for overlapping events, and may determine that both users 106 and 110 are likely to visit a movie theater on the same day. This allows computing devices 104 and 108 to recommend users 106 and 110 to visit the movie theater together, without having to reveal information for other location events that users 106 and 108 do not have in common.

In some embodiments, user profile 114 can store user-account information for one or more social-media services (e.g., a service hosted by a third-party server), which can be used by device 104 and/or application server 122 to access the third-party server to obtain user-location events associated with user 106. The user-account information may also include authorization tokens that can be used to allow computing device 104 or application server 122 to access a third-party server that provides a location-based service (e.g., an online social network) without requiring user 106 to provide a password. This authorization token can correspond to an open-authorization protocol, and allow computing device 104 or application server 110 to access some or all features from a user-account associated with user 106 (e.g., pictures, "friends," visited locations, articles read, and/or any other user-behavior information). Computing device 104 and/or application server 122 can use this authorization token to access the third-party server to obtain user-location events associated with user 106.

In some other embodiments, applications running on computing device 104 can generate location events 116 pertaining to user 106 either periodically or in response to a request from user 106, and can upload location events 116 to a third-party server. If an application is periodically polling a motion and/or location for user 106, computing device 104 can generate location events 116 to include a complete motion and/or location trace for user 106. Computing device 104 can also reduce a number of location events that are stored for user 106, for example, by only recording a location event when user 106 moves at least a threshold distance (e.g., 5 meters) from a recently recorded location event, or when the user's behavior changes state as determined based on a GPS sensor or accelerometer measurement (e.g., changes from walking to waiting, or changes from waiting to walking)

TABLE 1

65905786|Jan. 24, 2011 06:59:13|1295881153|Jan. 24, 2011 13:59:13|324199|6.5617541|106.7318938|IPB Dramaga|105| College & Education: University
65917051|Jan. 24, 2011 07:55:46|1295884546|Jan. 24, 2011 14:55:46|324199|6.5617541|106.7318938|IPB Dramaga|105| College & Education: University
65917494|Jan. 24, 2011 07:57:54|1295884674|Jan. 24, 2011 14:57:54|324199|6.5617541|106.7318938|IPB Dramaga|105| College & Education: University TABLE 1-continued 6592060|Jan. 24, 2011 08:13:05|1295885585|Jan. 24, 2011 15:13:05|324199|6.5617541|106.7318938|IPB Dramaga|105| College & Education: University
65928585|Jan. 24, 2011 08:57:30|1295888250|Jan. 24, 2011 15:57:30|324199|6.5617541|106.7318938|IPB Dramaga|105| College & Education: University
65929089|Jan. 24, 2011 09:00:10|1295888410|Jan. 24, 2011 16:00:10|324199|6.5617541|106.7318938|IPB Dramaga|105| College & Education: University As another example, computing device 104 can perform geo-fencing to store only location events 116 for when user 106 moves near a border of a geo-location fence (e.g., a border for a geographic region that has been assigned to an activity or an activity type). Table 1 presents an exemplary sequence of periodic location events that have been filtered using geo-fencing in accordance with an embodiment.

In some embodiments, application server 122 can also receive encrypted user-location events pertaining to a plurality of users. Application server 122 can group users that have visited or may visit the same location at the same time, and to provide a recommendation to this group of users, without decrypting the user-location events. Specifically, application server 122 can include or be coupled to a storage device 124, which can store use profiles 126 for a plurality of users, and can store encrypted user-location events 128 that server 122 has received for these users (e.g., from computing devices 104 and 108, or from a third-party server that provides a location-based service). Application server can also store recommendations 130 that may be presented to these users (e.g., venue locations, advertisements, coupons, etc.). When application server detects a group of users that are likely to visit a venue at the same time, application server 122 can provide recommendations to this group of users without having to decrypt the user-location information. For example, application server 122 can select a recommendation for this group of users based on user profiles that these users have shared with application server 122.

Figure 2:
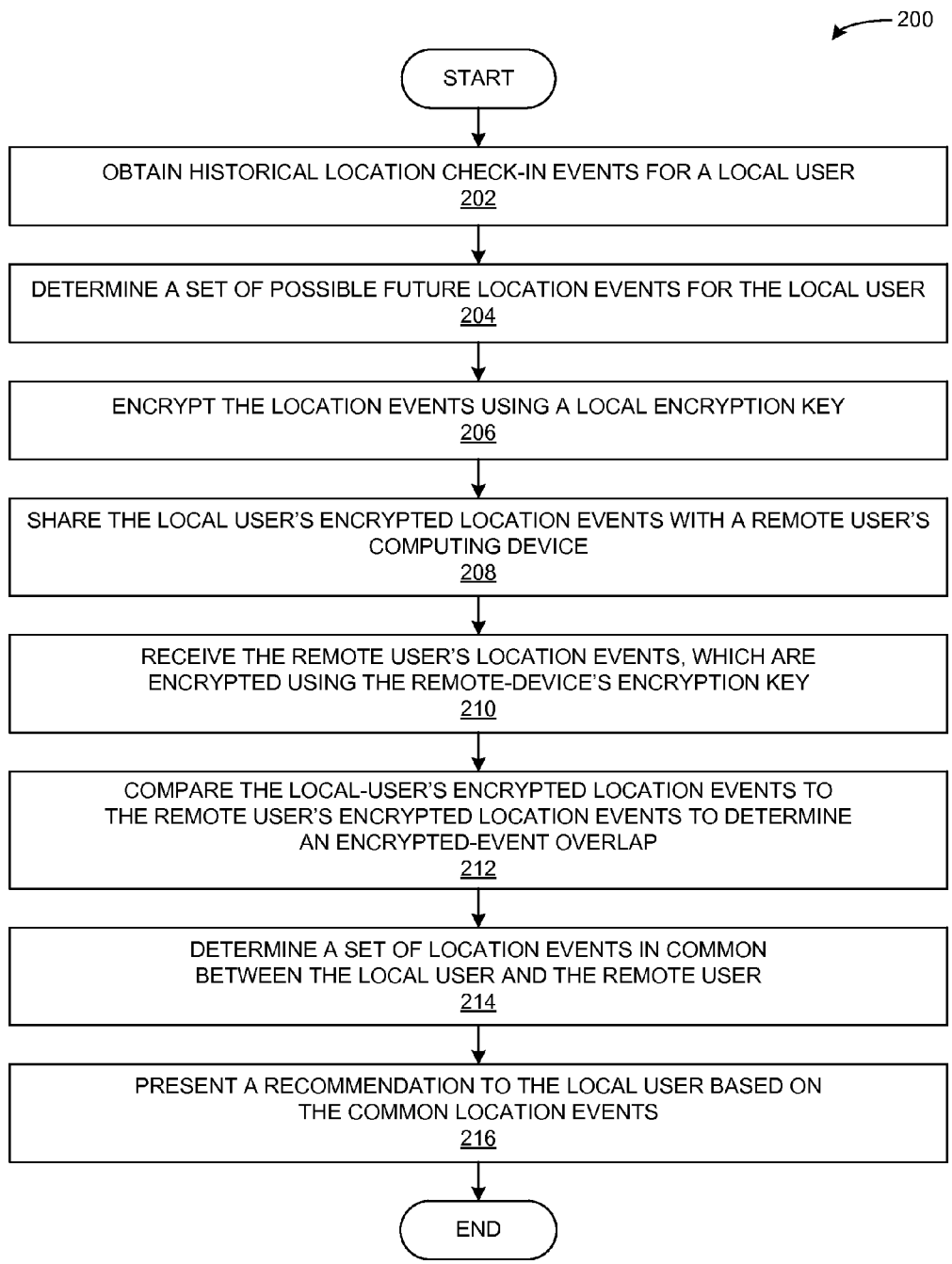
FIG. 2 presents a flow chart illustrating a method for detecting an overlap in location events between multiple users in accordance with an embodiment.

FIG. 2 presents a flow chart illustrating a method 200 for detecting an overlap in location events between multiple users in accordance with an embodiment. During operation, the system obtains historical location check-in events for a local user (operation 202), and can determine a set of possible future location events for the local user (operation 204). The system can extrapolate the user's historical behavior information to predict future location events, such as by extrapolating historical location events into the future (e.g., company meeting times), and/or by identifying possible future location events based on the user's calendar entries, email communications, etc.

The system then encrypts the user's location events using a local encryption key (operation 206), and shares the local user's encrypted location events with a remote computing device (operation 208). The local encryption key can include a public key which was generated by the remote device, or a private key which was generated by the local device. The remote computing device may correspond to another user, such as a friend of the local user which may be interested in joining the local user in an activity. However, in some embodiments, the remote computing device may correspond to a recommender system that generates recommendations to one or more users based on their similar location events (e.g., an online social network to which the local user is a member).

In some embodiments, the local user's device can detect the overlap with the remote user's location events by comparing encrypted location events from the local user and the remote user. For example, the system can receive the remote user's location events, which are encrypted using the remote device's encryption key (operation 210), and compares the local user's and the remote user's encrypted location events to determine the encrypted-event overlap (operation 212). The system then determines a set of location events in common between the local user and the remote user (operation 214), for example, by determining which of the local user's location events correspond to the overlapping encrypted location events.

Once the system has determined which events the local and remote users have in common, the system can select a recommendation that is suitable for the matching location events, and performs a computation on the set of location events in common between the local user and at least the remote user (operation 216). In some embodiments, these computations include computing aggregate statistics between the local user and the at least one remote user based on the encrypted-event overlap. For example, the aggregate statistics can include a sum of location events in common between the local user and the at least one remote user.

Further, the aggregate statistics can indicate distribution parameters for how the user's location-event overlap can change across different users, or can change related to a fixed group of users across various time windows (e.g., across various one-month time intervals). These distribution parameters can include an average number of location events in common between the local user and the remote user(s), and/or a variance for a number of location events in common between the local user and the remote user(s).

In some embodiments, during operation 216, the system can perform computations for selecting a recommendation that is suitable to the location-event overlap, and presents the selected recommendation to the local user. The recommendation may correspond to venues, social events, coupons, and/or advertisements that may be of interest to the local user, and/or may be of interest to other users associated with the location-event overlap.

In some embodiments, when sharing the local user's encrypted location events, the system can generate the set of encrypted location events in a way that preserves the user's privacy. The system can filter the location events that can be shared with others based on a privacy policy, and by receiving feedback from the user. The system can also pad the set of encrypted location events with additional random values to make it difficult for others to infer behavior information about the local user based on the user's encrypted location events.

Figure 3:
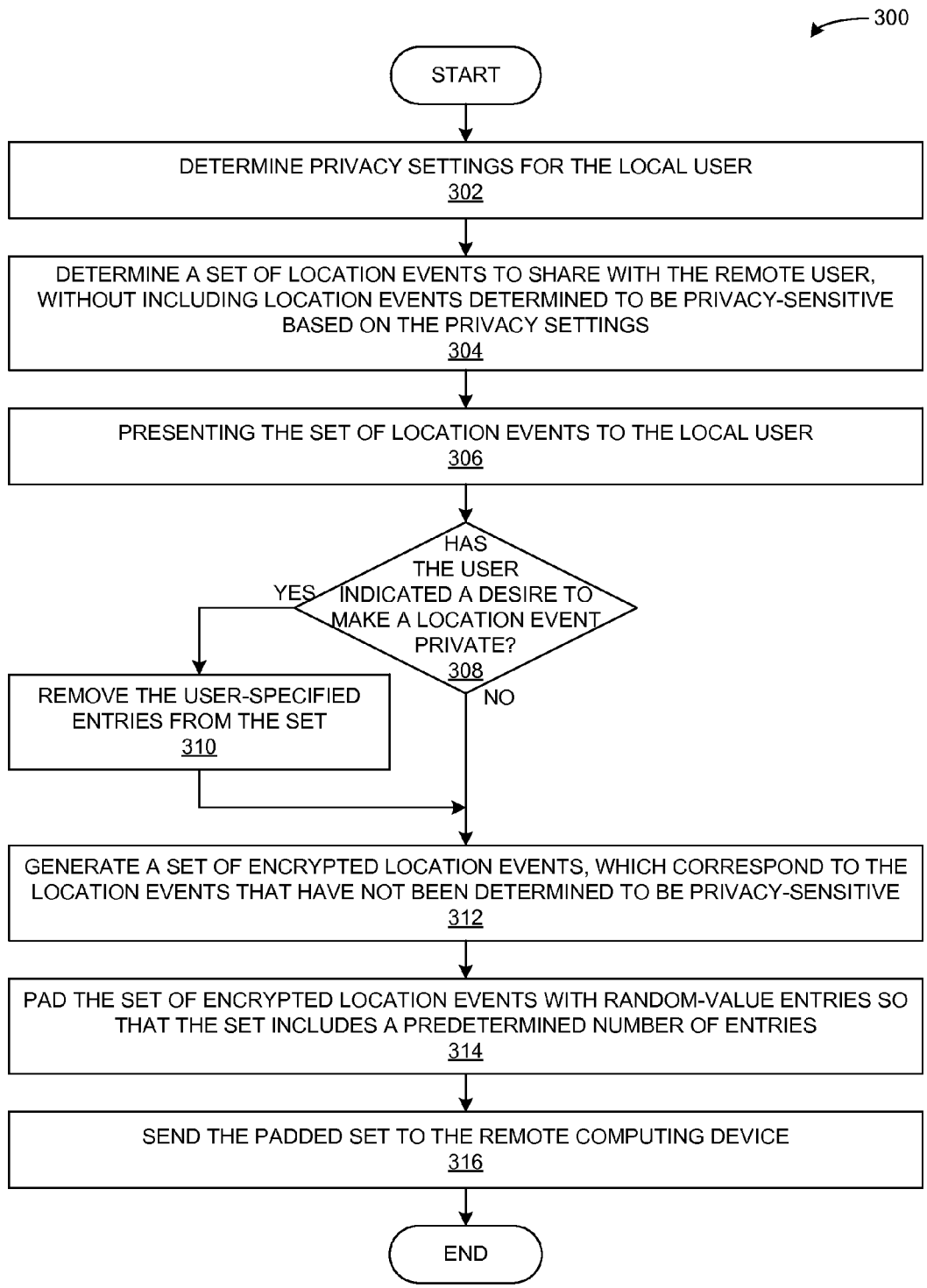
FIG. 3 presents a flow chart illustrating a method for protecting a user's privacy when sharing the user's set of location events in accordance with an embodiment.

FIG. 3 presents a flow chart illustrating a method 300 for protecting a user's privacy when sharing the user's set of location events in accordance with an embodiment. During operation, the system determines privacy settings for the local user (operation 302), and determines a set of location events to share with the remote device, without including location events that the system determines to be privacy-sensitive based on the user's privacy settings (operation 304).

The system can also interact with the user to further control which location events are shared with other devices. For example, the system can display a user interface that presents the set of location events to the local user (operation 306). This user interface can allow the user to select which location events the user desires to share with others, and/or which location events the user desires to keep private. The system then determines whether the user has indicated a desire to keep a location event private (operation 308).

If the user does not desire to keep any location events in the set private, the system proceeds to generate a set of encrypted location events, which correspond to the location events that have not been determined to be privacy sensitive (operation 312). However, if the user does desire to keep at least one location event private, the system removes these user-specified location events from the set (operation 310), and proceeds to operation 312 to generate the encrypted location events from the modified set.

In some embodiments, the user's set of encrypted location events may be small (e.g., 10 location events), which can make it easy for others to infer behavior information about the local user. For example, a small set allows others to infer that the user does not lead an active lifestyle. The system can further protect the user's privacy by padding the set of encrypted location events, such as by including additional random-value entries so that the set includes a predetermined number of entries (operation 314). Once the system has generated a set of encrypted location events that properly protects the user's privacy, the system proceeds to send the padded set to the remote computing device (operation 316).

Distributed Location-Event Comparisons

In some embodiments, devices can compare each other's location events through a secure distributed protocol that only reveals the location events that are shared amongst a group of entities. In this distributed protocol, two devices can each encrypt their respective location events using a local encryption key, and can compare their encrypted location events to find a match. If a match is found, the local device can use the encrypted location event to determine which plaintext location event is common to the local and remote users.

Figure 4:
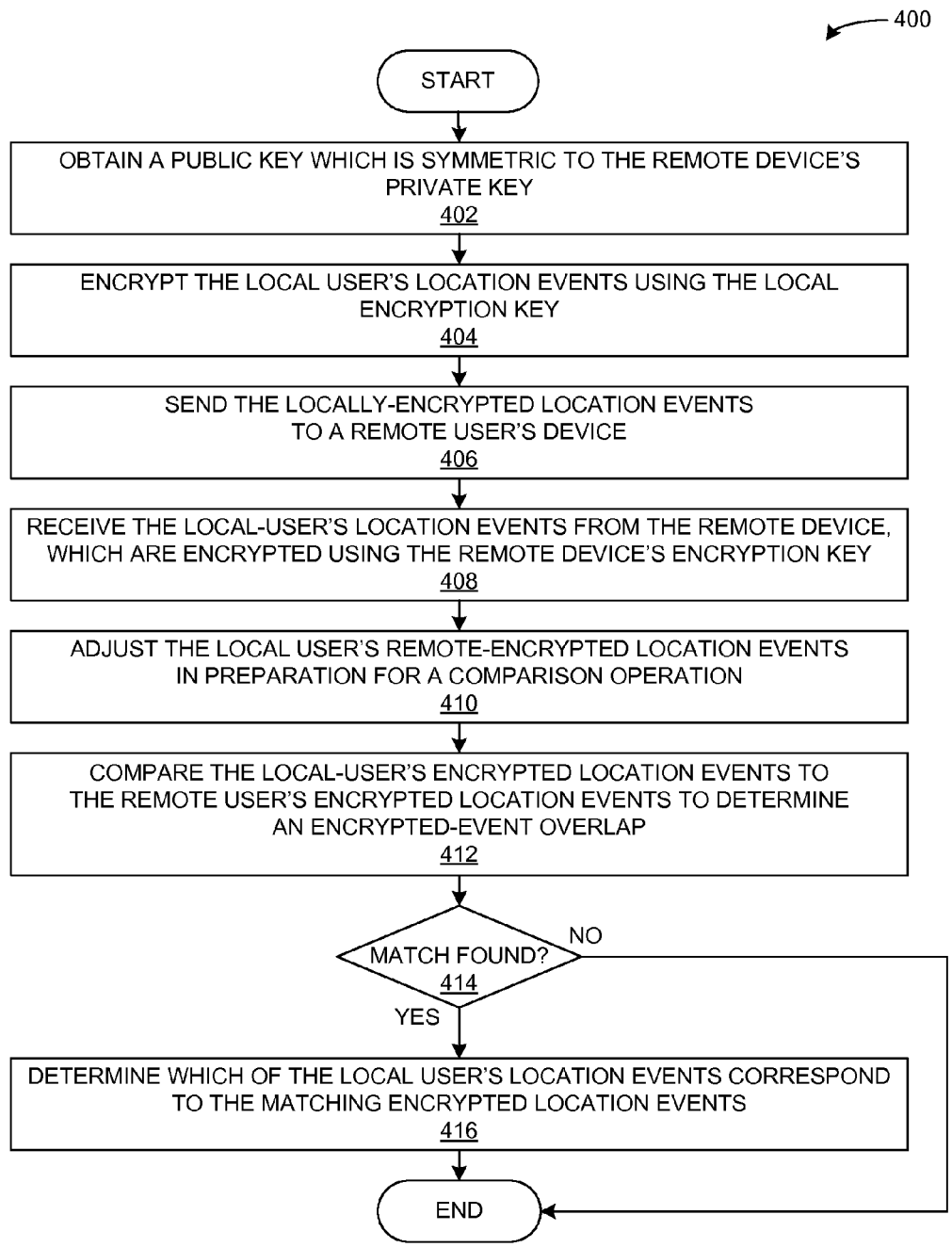
FIG. 4 presents a flow chart illustrating a method for comparing location events between different users in accordance with an embodiment.

FIG. 4 presents a flow chart illustrating a method 400 for comparing location events between different users in accordance with an embodiment. During operation, the system obtains a cryptographic key which is symmetric to the remote device's key (operation 402), from a data repository, or directly from the remote device. For example, during a protocol-initialization step, the remote device can generate symmetric public and private keys, and sends the public key to the local device. The local device can obtain the public key from the remote device prior to comparing location events with the remote device for the first time, and can store this public key to use during other subsequent location-event comparisons.

The remote device can generate values for variables (N,e, d), such N is a prime number. The tuple (N,d) serves as the remote device's private key, and the remote device provides the tuple (N,e) as the public key for the local device. The local device generates a random value $R_1 \in Z_N$, for a finite acyclic group $Z_N$ (e.g., $Z_N = \{1, 2, \ldots N\}$).

The system then encrypts the local user's location event using the local encryption key (operation 404), and sends the locally-encrypted location events to the remote device (operation 406). For example, the system can generate a locally-encrypted location event $\alpha_i$ for a location event $A_i$ as follows:

$$\alpha_i = (H(A_i) * R_1^e) \bmod N \qquad (1)$$

In equation (1), $H(A_i)$ corresponds to a hash value for location event $A_i$, based on a predetermined hash function H that is common to the local and remote devices. The remote device processes the locally-encrypted location events using the remote device's encryption key.

The local device then receives, from the remote device, the local user's location events encrypted using the remote device's encryption key (operation 408). The remote device produces the remotely-encrypted local-user event, $\gamma_i$, as follows:

$$\gamma_i = \alpha_i^d \bmod N \qquad (2)$$

Expanding equation (2) using the locally-encrypted location event $\alpha_i$ from equation (1) produces:

$$\gamma_i = H(A_i)^d R_1 \bmod N \qquad (3)$$

Recall that the system can also receive the remote entity's location events, in encrypted form. These remotely-encrypted remote-user events have the form:

$$\beta_i = H(H(B_i)^d \bmod N) \quad (4)$$

In equation (4), (N,d) corresponds to a private key generated by the remote device, and $H(B_i)$ corresponds to a hash value for event description $B_i$.

In some embodiments, the system adjusts the local user's remote-encrypted location events (from equation 3) to convert them into a form that resembles the remote device's encrypted location events from equation (4) (operation 412). Hence, by performing operation 412, the system adjusts the encrypted location events from equation (3) to have the form:

$$\alpha_i' = H(\gamma_i/R_1) \quad (5)$$

Expanding equation (5) using the locally-encrypted location event a, from equation (3) produces:

$$\alpha_i' = H(H(A_i)^d \bmod N) \quad (6)$$

Note that $\alpha_i'$ in equation (6) has the same form as $\beta_i$ in equation (4). Hence, when the local user and the remote user have matching location events $A_i$ and $B_j$, the encrypted values $\alpha_i'$ and $\beta_j$ will also be matching values.

The system then compares the local user's encrypted location events (from equation 6) to the remote user's encrypted location events (from equation 4), to determine an encrypted-event overlap (operation 412). If the system detects a matching encrypted location event, the system searches for a location-event description that corresponds to this matching encrypted location event (operation 416). Continuing the example from above, if the system determines that a remote user's encrypted value $\beta_j$ matches the local user's encrypted value $\alpha_i'$, the system searches for the location event $A_i$ that corresponds to the encrypted value $\alpha_i'$. This location event $A_i$ also corresponds to the remote user's encrypted value $\beta_j$.

Figure 5:
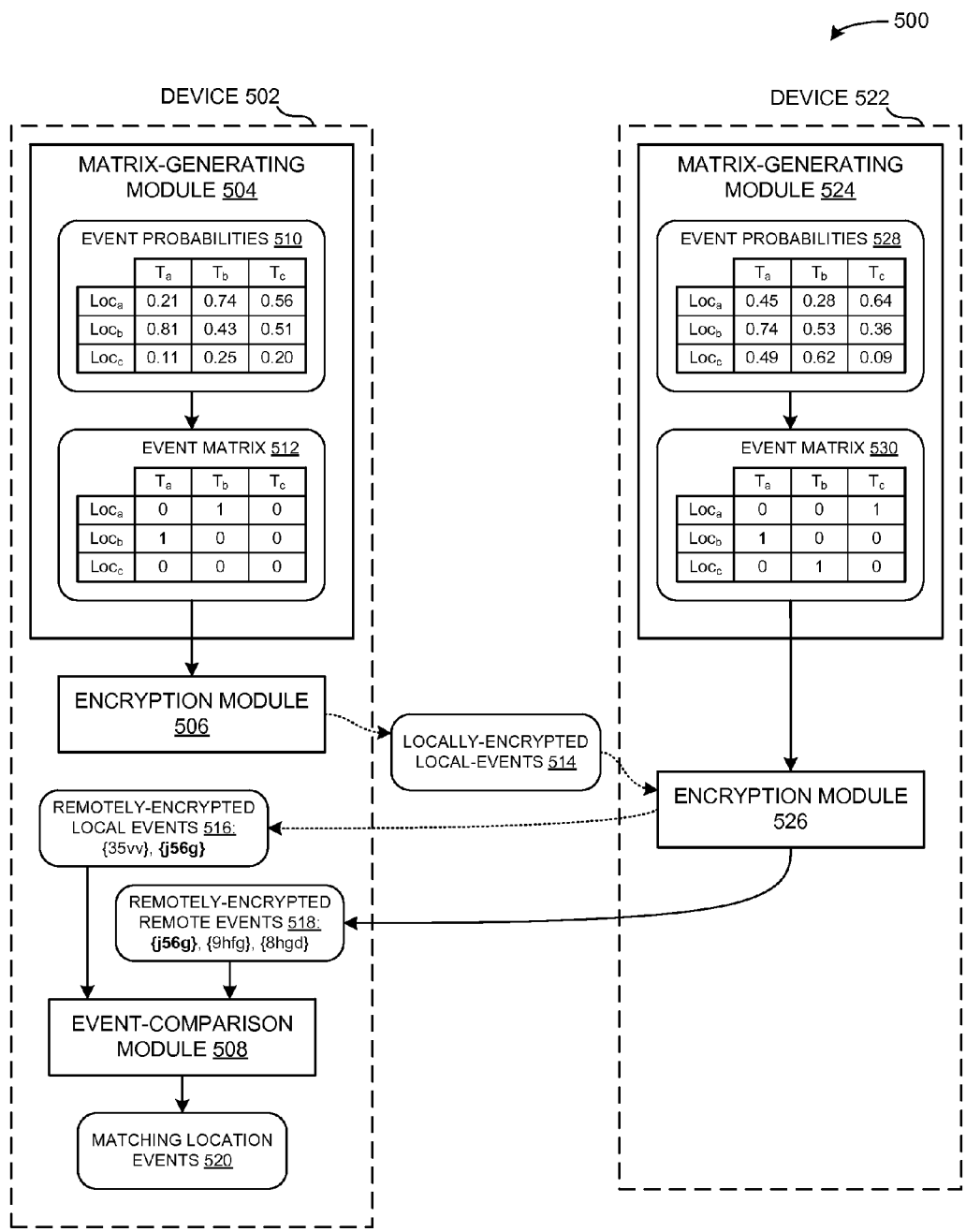
FIG. 5 illustrates a set of peer devices which determine common locations between their respective users in accordance with an embodiment.

FIG. 5 illustrates a set of peer devices 502 and 522 which determine common locations between their respective users in accordance with an embodiment. Specifically, device 502 can include a matrix-generating module 504, an encryption module 506, and an event-comparison module 508. Matrix-generating module 504 can generate an event probability matrix 510 for a local user, which indicates a probability for various location events. Each row of probability matrix can correspond to a given location (e.g., corresponding to a geographic area, or a location name), and each column of probability matrix can correspond to a given time interval. Each cell of probability matrix 502 indicates a probability that the user will visit a given location at a given time interval. For example, probability matrix 510 indicates that the local user has an 81% probability of visiting a location "$Loc_b$" at a time interval "$T_a$."

Matrix-generating module 504 can also generate an event matrix 512, based on probability matrix 510. Each cell of event matrix 512 specifies a binary value indicating whether the user is likely to visit a given location at a given time interval. In some embodiments, the system assigns a "1" binary value to a cell of event matrix 512 when the corresponding event probability is greater than or equal to a predetermined threshold value. For example, if the threshold probability value is 0.60, the system assigns a binary value "1" for a location event where the user visits location $Loc_b$ during time interval $T_a$ (which has a probability of 0.81). Further, the system assigns a binary value "0" for a location event where the user visits location $Loc_b$ during a time interval $T_b$ (which has a probability of 0.43).

In some embodiments, device 502 uses event matrix 512 to generate the set of user-location events S, by including location events only for cells of event matrix 512 that store a "1" binary value. Using a threshold probability of 0.6, the system generates the set $S = \{(Loc_a, T_b), (Loc_b, T_a)\}$. Encryption module 506 then generates a set of locally-encrypted local-events 514. Device 502 then sends locally-encrypted local-events 514 to device 522, which encrypts the items in set 514 using a private key that is local to device 522, to generate a set of remotely-encrypted local events 516.

Similarly, device 522 can include a matrix-generating module 524 that generates a probability matrix 528, and generates an event matrix 530, for a user associated with device 522. Device 522 also includes an encryption module 526 that encrypts location events associated with a "1" entry in event matrix 530 to generate a set of encrypted location events 518.

Returning back to device 502, after sending locally-encrypted local-events 514 to device 522, device 502 can receive remotely-encrypted local events 516 from device 522, as well as remotely-encrypted remote events 518 that were generated based on event matrix 530. Note that both sets 516 and 518 are "remotely-encrypted" as characterized by equations (6) and (4), respectively, given that elements in sets 516 and 518 are encrypted using the private key for device 522. Hence, event-comparison module 508 can compare the items in sets 516 and 518 directly, which correspond to location events for users of devices 502 and 522, respectively, to identify matching location events 520 that are common to both users. For example, event-comparison module 508 can determine that encrypted event {j56g} exists in both sets 516 and 518, and that encrypted event {j56g} corresponds to location event ($Loc_b$, $T_a$). Thus, event-comparison module 506 generates matching location events 520 to include the set $\{(Loc_b, T_a)\}$.

Note that, while the example illustrated in FIG. 5 presents probability matrices and event matrices with matching location sets (e.g., matrix rows) and time intervals (e.g., matrix columns), it is possible for devices 502 and 522 to each generate a matrix whose rows and columns correspond to locations and time intervals that are relevant to a local user.

Centralized Location-Event Comparisons

Figure 6:
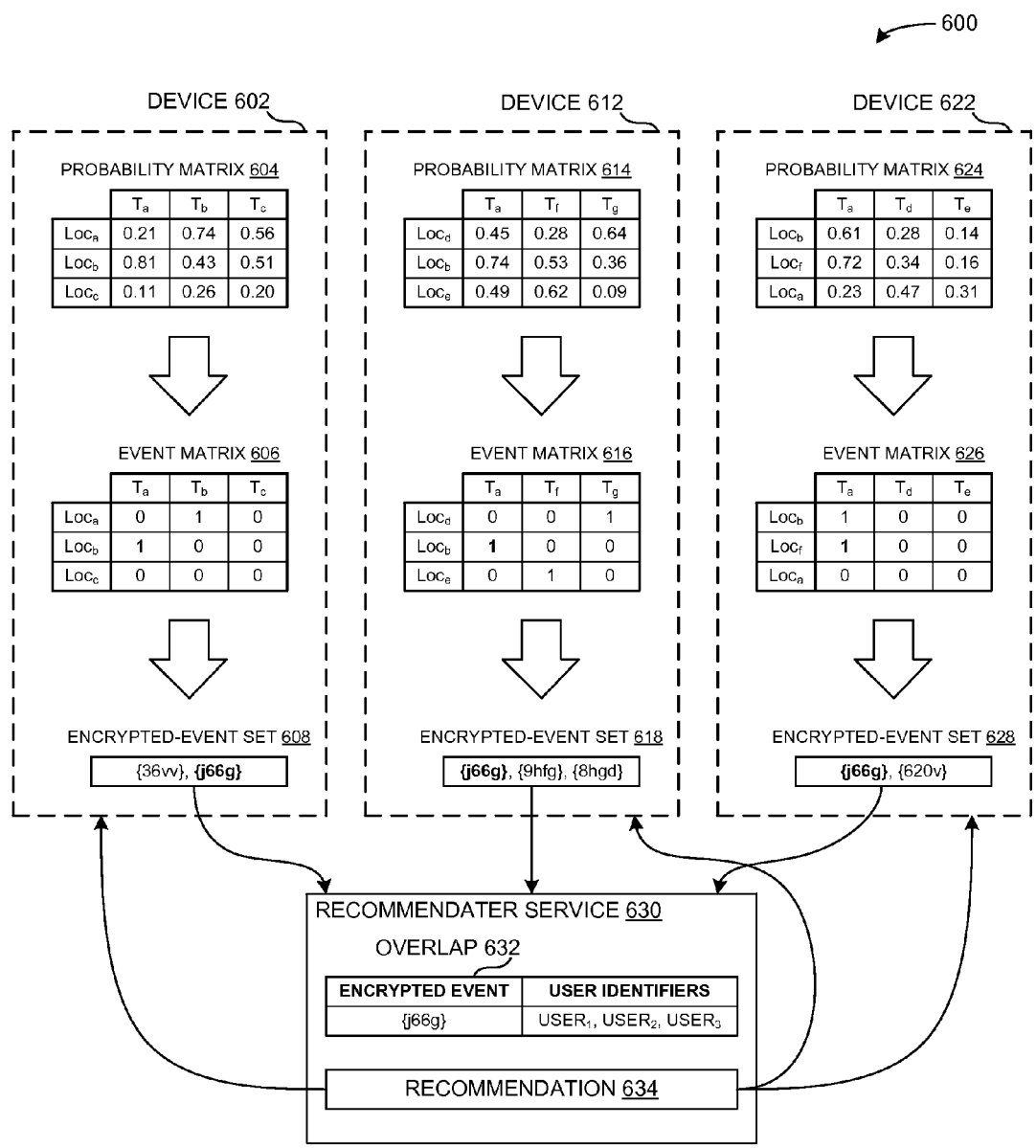
FIG. 6 illustrates a recommender service determining common locations for users of a set of peer devices in accordance with an embodiment.

FIG. 6 illustrates a recommender service 630 determining common locations for users of a set of peer devices in accordance with an embodiment. Specifically, devices 602, 612, and 622 each generates a probability matrix for a local user, and generates a corresponding encrypted-event set that includes encrypted location-events for the local user. Devices 602, 612, and 622 can each share a local user's encrypted-event set with recommender service 630 that processes these encrypted-event sets to provide relevant recommendations to the users. In some embodiments, devices 602, 612, and 622 encrypt the individual location events using a shared public key which has been generated and disseminated by recommender service 630.

For example, device 602 may generate a probability matrix 604 for locations $\{Loc_a, Loc_b, Loc_c\}$ and time intervals $\{T_a, T_b, T_c\}$, and generates event matrix 606 indicating that the user is likely to visit $Loc_b$ during time interval $T_a$, and $Loc_a$ during time interval $T_b$. Device 602 generates encrypted-event set 608, which includes the encrypted location events {36vv} and {j66g} that correspond to location events ($Loc_b$, $T_a$) and ($Loc_a$, $T_b$), respectively. Similarly, device 612 generates an encrypted-event set 618 to share with recommender service 630, based on a probability matrix 614 and event matrix 616 for a local user. Device 622 also generates an encrypted-event set 628 based on a probability matrix 624 and event matrix 626 for a local user.

In some embodiments, recommender service 630 periodically receives encrypted event sets 608, 618, and 628 from devices 602, 612, and 622, respectively. Recommender service 630 can compare the encrypted location events, without decrypting the location events, to determine an overlap 632 in the users' previous or future location traces. For the example above, overlap 632 indicates that encrypted event {j66g} is common to users $USER_1$, $USER_2$, and $USER_3$ (e.g., corresponding to devices 602, 612, and 622, respectively).

Recommender service 630 can use overlap 632 to make a recommendation to users $USER_1$, $USER_2$, and $USER_3$. For example, recommender service 630 may be a part of a larger user-oriented service, such as an online social network, and makes recommendations that enhances a user's experience within the larger service, and with other users in the service. Recommendation 634 can introduce users $USER_1$, $USER_2$, and $USER_3$ to each other if they are not already friends. If these users are already "friends" within the larger service, recommendation 634 may recommend a venue (e.g., a restaurant) or an activity for these users.

In some embodiments, recommender service 630 may have access to user profiles that describe each user's demographic, preferences (e.g., favorite activities), user-generated ratings (e.g., ratings for venues or services), etc. Hence, recommender service 630 can make a recommendation for users $USER_1$, $USER_2$, and $USER_3$ based on one or more user profiles for these users, without decrypting their shared location event specified by overlap 632. For example, recommendation 634 may recommend a venue or activity selected from a broad list of known venues and activities that have received descriptions and ratings from other similar users (e.g., venues provided by Yelp).

In some other embodiments, overlap 632 can serve as an advertisement opportunity. Recommender service 630 can generate an advertisement opportunity for overlap 632, based on user profiles for one or more of users $USER_1$, $USER_2$, and $USER_3$, and selects recommendation 634 from a collection of advertisements whose bids correspond to the advertisement opportunity.

Figure 7:
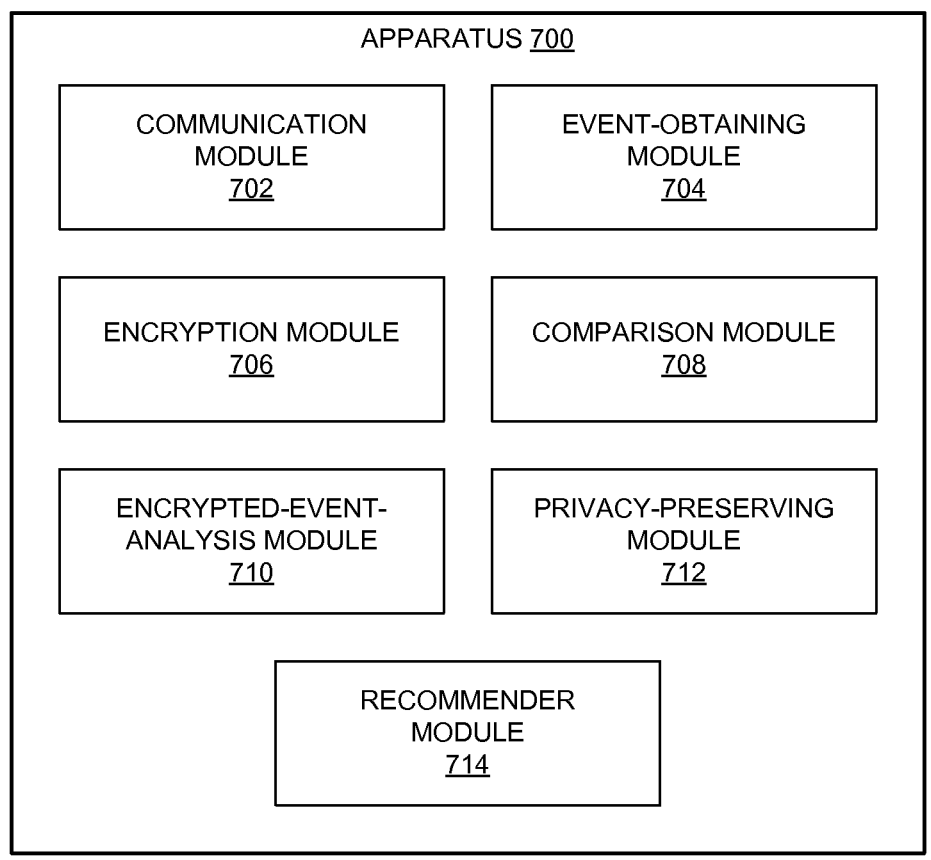
FIG. 7 illustrates an exemplary apparatus that facilitates determining common locations for two or more entities in accordance with an embodiment.

FIG. 7 illustrates an exemplary apparatus 700 that facilitates determining common locations for two or more entities in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a communication module 702, an event-obtaining module 704, an encryption module 706, a comparison module 708, an encrypted-event-analysis module 710, a privacy-preserving module 712, and a recommendation module 714.

In some embodiments, event-obtaining module 704 can obtain location-event descriptions for locations that a local user has visited and/or is likely to visit. Encryption module 706 can encrypt the location-event descriptions to generate a corresponding set of encrypted local-user events. Communication module 702 can send the encrypted local-user events to the remote device, and can receive encrypted remote-user events from a remote device for at least one remote user.

Comparison module 708 can determine an encrypted-event overlap, for example, by determining an overlap between the set of encrypted local-user events and the set of encrypted remote-user events. Encrypted-event-analysis module 710 can determine, from the encrypted-event overlap, one or more location-event descriptions for locations that the local and remote users have both visited and/are likely to both visit during the same time interval. Privacy-preserving module 712 can modify the set of encrypted local-user events to further preserve the local user's privacy. Recommender module 714 can provide a recommendation to at least the local user based on the encrypted-event overlap.

Figure 8:
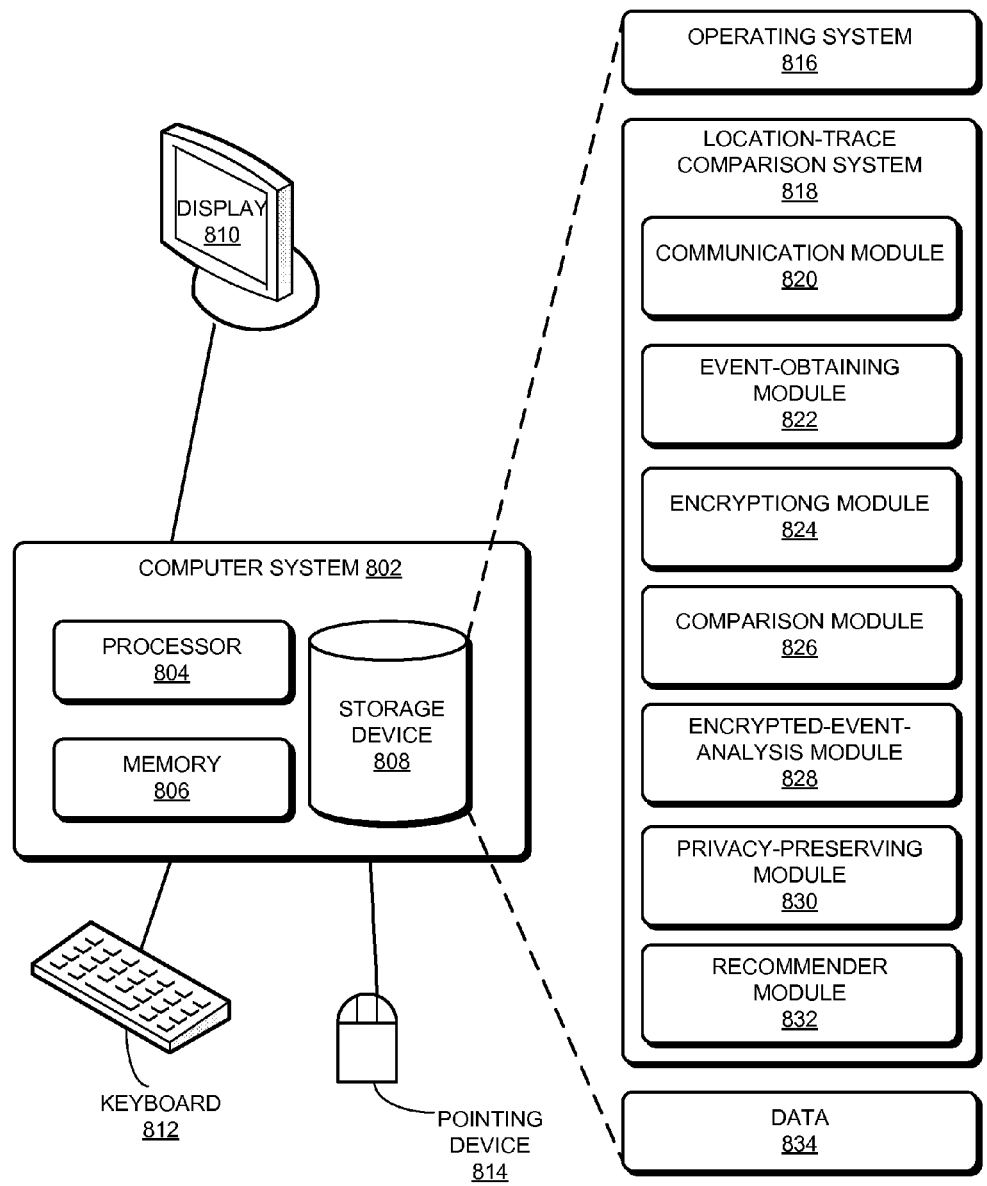
FIG. 8 illustrates an exemplary computer system that facilitates determining common locations for two or more entities in accordance with an embodiment.

FIG. 8 illustrates an exemplary computer system 800 that facilitates determining common locations for two or more entities in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, a location-trace comparison system 818, and data 834.

Location-trace comparison system 818 can include instructions, which when executed by computer system 802, can cause computer system 802 to perform methods and/or processes described in this disclosure. Specifically, system 818 can include instructions for obtaining location-event descriptions for locations that a local user has visited and/or is likely to visit (event-obtaining module 822), and can include instructions for encrypting the location-event descriptions to generate a corresponding set of encrypted local-user events (encryption module 824). System 818 can also include instructions for sending the encrypted local-user events to the remote device, and receiving encrypted remote-user events from a remote device for at least one remote user (communication module 820)

Further, location-trace comparison system 818 can include instructions for determining an encrypted-event overlap, for example, by determining an overlap between the set of encrypted local-user events and the set of encrypted remote-user events (comparison module 826). System 818 can also include instructions for determining, from the encrypted-event overlap, one or more location-event descriptions for locations that the local and remote users have both visited and/are likely to both visit during the same time interval (encrypted-event analysis module 828). Further, system 818 can also include instructions for modifying the set of encrypted local-user events to further preserve the local user's privacy (privacy-preserving module 830), and can include instructions for providing a recommendation to at least the local user based on the encrypted-event overlap (recommender module 832).

Data 834 can include any data that is required as input or that is generated as output by the methods and/or processes described in this disclosure. Specifically, data 834 can store at least a user profile for at least a local user, historical events for the local user, privacy settings for the local user, cryptographic keys, a probability matrix for the local user, an event matrix for the local user, as well as advertisements and/or recommendations that may be presented to the local user.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    obtaining location-event descriptions for locations that a local user is likely to visit, wherein a respective location-event description indicates a location identifier and a time-interval identifier;
    encrypting the location-event descriptions to generate a corresponding set of encrypted local-user events;
    receiving, from a remote device, encrypted remote-user events for at least one remote user;
    determining an encrypted-event overlap, which involves determining an overlap between the set of encrypted local-user events and the set of encrypted remote-user events;
    determining, from the encrypted-event overlap, one or more location-event descriptions for locations that the local and remote users are both likely to visit during the same time interval,
    modifying the set of encrypted local-user events to further preserve the local user's privacy, which involves one or more of:
    removing entries associated with a restricted location identifier;
    removing entries associated with a restricted time interval;
    removing entries for location events of the local user; and
    padding the set of encrypted local-user events to include a set of random-value entries; and
    sending the modified set of encrypted local-user events to the remote device.

2. The method of claim 1, wherein encrypting a respective location-event description, $A_i$, involves computing:

$$\alpha_i = (H(A_i) * R_1^e) \bmod N;$$

wherein (N,e) corresponds to a public key published by the remote device, wherein $R_1$ corresponds to a random number $R_1 \in Z_N$ generated by the local device, and wherein $H(A_i)$ corresponds to a hash value for event description $A_i$.

3. The method of claim 1, wherein determining the encrypted-event overlap involves:
    sending, to the remote device, the encrypted local-user events;
    receiving a set of remote-encrypted local-user events;
    comparing the remote-encrypted local-user events to the encrypted remote-user events; and
    determining one or more remote-encrypted local-user events that have a matching encrypted remote-user event.

4. The method of claim 3, wherein the remote-encrypted local-user event, $\gamma_i$, has the form:

$$\gamma_i = \alpha_i^d \bmod N = H(A_i)^d R_1 \bmod N;$$

wherein $\alpha_i$ corresponds to an encrypted local-user event for an event description $A_i$, wherein (N,d) corresponds to a private key generated by the remote device, wherein $R_1$ corresponds to a random number generated by the local device, and wherein $H(A_i)$ corresponds to a hash value for the event description $A_i$.

5. The method of claim 4, wherein comparing the remote-encrypted local-user events to the encrypted remote-user events involves:
    adjusting the remote-encrypted local-user event for a comparison operation, by computing an adjusted value $H(\gamma_i/R_1)$; and
    comparing the adjusted value to the set of encrypted remote-user events.

6. The method of claim 1, wherein the encrypted remote-user event has the form:

$$\beta_i = H(H(B_i)^d \bmod N);$$

wherein (N,d) corresponds to a private key generated by the remote device, and wherein $H(B_i)$ corresponds to a hash value for event description $B_i$.

7. The method of claim 1, further comprising computing aggregate statistics between the local user and the at least one remote user based on the encrypted-event overlap, wherein the aggregate statistics includes one or more of:
    a sum of location events in common between the local user and the at least one remote user;
    an average number of location events in common between the local user and the at least one remote user; and
    a variance for a number of location events in common between the local user and the at least one remote user.

8. The method of claim 1, further comprising generating a recommendation for the local user, based on the encrypted-event overlap.

9. A non-transitory computer-readable storage medium storing instructions that when executed by a computer cause the computer to perform a method, the method comprising:
    obtaining location-event descriptions for locations that a local user is likely to visit, wherein a respective location-event description indicates a location identifier and a time-interval identifier;
    encrypting the location-event descriptions to generate a corresponding set of encrypted local-user events;
    receiving, from a remote device, encrypted remote-user events for at least one remote user;
    determining an encrypted-event overlap, which involves determining an overlap between the set of encrypted local-user events and the set of encrypted remote-user events;
    determining, from the encrypted-event overlap, one or more location-event descriptions for locations that the local and remote users are both likely to visit during the same time interval;

modifying the set of encrypted local-user events to further preserve the local user's privacy, which involves one or more of:
  removing entries associated with a restricted location identifier;
  removing entries associated with a restricted time interval;
  removing entries for location events of the local user; and
  padding the set of encrypted local-user events to include a set of random-value entries; and
sending the modified set of encrypted local-user events to the remote device.

10. The storage medium of claim 9, wherein encrypting a respective location-event description, $A_i$, involves computing:

$$\alpha_i = (H(A_i) * R_1^e) \bmod N;$$

wherein (N,e) corresponds to a public key published by the remote device, wherein $R_1$ corresponds to a random number $R_1 \in Z_N$ generated by the local device, and wherein $H(A_i)$ corresponds to a hash value for event description $A_i$.

11. The storage medium of claim 9, wherein determining the encrypted-event overlap involves:
  sending, to the remote device, the encrypted local-user events;
  receiving a set of remote-encrypted local-user events;
  comparing the remote-encrypted local-user events to the encrypted remote-user events; and
  determining one or more remote-encrypted local-user events that have a matching encrypted remote-user event.

12. The storage medium of claim 11, wherein the remote-encrypted local-user event, $\gamma_i$, has the form:

$$\gamma_i = \alpha_i^d \bmod N = H(A_i)^d R_1 \bmod N;$$

wherein $\alpha_i$ corresponds to an encrypted local-user event for an event description $A_i$, wherein (N,d) corresponds to a private key generated by the remote device, wherein $R_1$ corresponds to a random number generated by the local device, and wherein $H(A_i)$ corresponds to a hash value for the event description $A_i$.

13. The storage medium of claim 12, wherein comparing the remote-encrypted local-user events to the encrypted remote-user events involves:
  adjusting the remote-encrypted local-user event for a comparison operation, by computing an adjusted value $H(\gamma i / R1)$; and
  comparing the adjusted value to the set of encrypted remote-user events.

14. The storage medium of claim 9, wherein the method further comprises computing aggregate statistics between the local user and the at least one remote user based on the encrypted-event overlap, wherein the aggregate statistics includes one or more of:
  a sum of location events in common between the local user and the at least one remote user;
  an average number of location events in common between the local user and the at least one remote user; and
  a variance for a number of location events in common between the local user and the at least one remote user.

15. The storage medium of claim 9, wherein the encrypted remote-user event has the form:

$$\beta_i = H(H(B_i)^d \bmod N);$$

wherein (N,d) corresponds to a private key generated by the remote device, and wherein $H(B_i)$ corresponds to a hash value for event description $B_i$.

16. The storage medium of claim 9, wherein the method further comprises generating a recommendation for the local user, based on the encrypted-event overlap.

17. An apparatus, comprising:
  an event-obtaining module to obtain location-event descriptions for locations that a local user is likely to visit, wherein a respective location-event description indicates a location identifier and a time-interval identifier;
  an encryption module to encrypt the location-event descriptions to generate a corresponding set of encrypted local-user events;
  a communication module to receive, from a remote device, encrypted remote-user events for at least one remote user;
  a comparison module to determine an encrypted-event overlap, which involves determining an overlap between the set of encrypted local-user events and the set of encrypted remote-user events;
  an encrypted-event-analysis module to determine, from the encrypted-event overlap, one or more location-event descriptions for locations that the local and remote users are both likely to visit during the same time interval,
  a privacy-preserving module to modify the set of encrypted local-user events to further preserve the local user's privacy; and
  a sending module to send the modified set of encrypted local-user events to the remote device:
  wherein while modifying the set of encrypted local-user events, the privacy-preserving module is further configured to perform one or more of:
  removing entries associated with a restricted location identifier;
  removing entries associated with a restricted time interval;
  removing entries for location events of the local user; and
  padding the set of encrypted local-user events to include a set of random-value entries.

18. The apparatus of claim 17, wherein while encrypting a respective location-event description, $A_i$, the encryption module is further configured to compute:

$$\alpha_i = (H(A) * R_1^e) \bmod N;$$

wherein (N,e) corresponds to a public key published by the remote device, wherein $R_1$ corresponds to a random number $R_1 \in Z_N$ generated by the local device, and wherein $H(A_i)$ corresponds to a hash value for event description $A_i$.

19. The apparatus of claim 17, wherein while determining the encrypted-event overlap, the comparison module is further configured to:
  send, to the remote device, the encrypted local-user events;
  receive a set of remote-encrypted local-user events;
  compare the remote-encrypted local-user events to the encrypted remote-user events; and
  determine one or more remote-encrypted local-user events that have a matching encrypted remote-user event.

20. The apparatus of claim 19, wherein the remote-encrypted local-user event, $\gamma_i$, has the form:

$$\gamma_i = \alpha_i^d \bmod N = H(A_i)^d R_1 \bmod N;$$

wherein $\alpha_i$ corresponds to an encrypted local-user event for an event description $A_i$, wherein (N,d) corresponds to a private key generated by the remote device, wherein $R_1$ corresponds to a random number generated by the local device, and wherein $H(A_i)$ corresponds to a hash value for the event description $A_i$.

21. The apparatus of claim 20, wherein comparing the remote-encrypted local-user events to the encrypted remote-user events involves:

adjusting the remote-encrypted local-user event for a comparison operation, by computing an adjusted value $H(\gamma i/R1)$; and comparing the adjusted value to the set of encrypted remote-user events.

22. The apparatus of claim 17, wherein the encrypted remote-user event has the form:

$\beta_i = H(H(B_i)^d \bmod N);$ wherein (N,d) corresponds to a private key generated by the remote device, and wherein $H(B_i)$ corresponds to a hash value for event description $B_i$.

23. The apparatus of claim 17, wherein the apparatus includes a computation module to compute aggregate statistics between the local user and the at least one remote user based on the encrypted-event overlap, wherein the aggregate statistics includes one or more of:

a sum of location events in common between the local user and the at least one remote user;

an average number of location events in common between the local user and the at least one remote user; and a variance for a number of location events in common between the local user and the at least one remote user.

24. The apparatus of claim 17, wherein the apparatus includes a generation module to generate a recommendation for the local user, based on the encrypted-event overlap.

\* \* \* \* \*